United States Patent [19]
McClure

[11] 3,864,404
[45] Feb. 4, 1975

[54] SYNTHESIS OF ETHYL VINYL KETONE
[75] Inventor: James D. McClure, Oakland, Calif.
[73] Assignee: Shell Oil Company, New York, N.Y.
[22] Filed: Nov. 6, 1969
[21] Appl. No.: 874,676

[52] U.S. Cl............................................. 260/597 R
[51] Int. Cl............................................. C07c 45/08
[58] Field of Search......... 260/597 B, 597 A, 597 R

[56] References Cited
UNITED STATES PATENTS
2,327,066   8/1943   Roelen............................ 260/597 A
2,473,995   6/1949   Greshman et al................ 260/597 A
2,564,104   8/1951   Greshman........................... 260/604

FOREIGN PATENTS OR APPLICATIONS
491,136   3/1963   Canada............................ 260/597 A
670,895   4/1952   Great Britain...................... 260/597

Primary Examiner—Bernard Helfin
Assistant Examiner—W. B. Lone

[57] ABSTRACT

Ethyl vinyl ketone is prepared with high selectivity by the reaction of ethylene with carbon monoxide at elevated temperatures and pressures in the presence of a group Ib metal-carbonyl catalyst.

6 Claims, No Drawings

SYNTHESIS OF ETHYL VINYL KETONE

BACKGROUND OF THE INVENTION

It is known that numerous metals and metal compounds are effective catalysts for the reaction of olefins with carbon monoxide and hydrogen to form saturated ketones, such hydrogen being provided as the gas or as an active-hydrogen compound such as water. Gresham et al., in U.S. Pat No. 2,473,995, issued June 21, 1949 disclose a typical process wherein the saturated ketone, diethyl ketone, is prepared from ethylene, carbon monoxide and hydrogen, preferably with an ethylene:carbon monoxide:hydrogen molar ratio of about 1:1.5:0.15, using a catalyst such as nickel, cobalt, iron, copper, ruthenium, cobalt carbonyl, nickel carbonyl and the like. No formation of ethyl vinyl ketone is reported.

The presence of hydrogen or a suitable hydrogen source is apparently essential to the activity of conventional carbonylation catalysts. When an admixture of ethylene and carbon monoxide and no hydrogen or hydrogen source are contacted with such generally effective carbonylation catalysts as $Co_2(CO)_8$, $Fe_3(CO)_9$, $Re_2(CO)_{10}$, cobalt metal or rhodium carbonyl, no carbonylation is observed. No saturated or unsaturated ketones (i.e., diethyl ketone, ethyl vinyl ketone or divinyl ketone) are formed. As a result, in the past it has been necessary to resort to more complicated and less commercially attractive processes to prepare ethyl vinyl ketone. In a known process ethyl vinyl ketone is prepared by the reaction of ethylene with acetyl halide in the presence of an aluminum halide catalyst.

Ethyl vinyl ketone is a material of established utility. It is known that ethyl vinyl ketone may be reacted with lower alkanols to form materials useful as solvents having reduced air-pollution characteristics, for example, the reaction of ethyl vinyl ketone with methanol yields 1-methoxy-3-pentanone a useful solvent. Ethyl vinyl ketone is also useful as a feedstock in the preparation of polyalkanols, being readily polymerized to polyketones using both anionic and free radical polymerization initiators, which polyketones are then reduced to polyalkanols useful as plasticizers and the like.

STATEMENT OF THE INVENTION

It has now been found that ethyl vinyl ketone is produced in high selectivity by reaction of ethylene and carbon monoxide in the substantial absence of hydrogen at a temperature of from about 140°C to about 250°C and an ethylene to carbon monoxide molar ratio of from about 3 to 1 to about 20 to 1 in liquid phase in the presence of a catalyst comprising a metal of the Ib Group of the Periodic Table of the Elements in a low oxidation state in complex combination with carbon monoxide.

DESCRIPTION OF PREFERRED EMBODIMENTS

Catalyst

Catalysts suitable for the process of the invention comprise complex combinations of carbon monoxide and one or more of the Group Ib metals, i.e., copper, silver and gold, in a low oxidation state such as the 0 or +1 oxidation state. Preferred catalysts comprise complex combinations of carbon monoxide with low oxidation state copper or silver. Carbon monoxide complex catalysts of cuprous copper are most preferred.

Suitable low oxidation state Group Ib metal carbonyl complex catalysts can be prepared by a diversity of methods. A simple method is to form the metal complex in situ in the reaction mixture from elemental Group Ib metal and carbon monoxide, the metal being present in a massive or finely divided form or deposited on an inert support. When this method is employed with copper as metal, at least a portion of the solid with copper as metal dissolves during the reaction to give soluble low oxidation state copper, primarily cuprous copper so that the catalyst is in part heterogeneous and in part homogeneous. In another catalyst preparation method, the metal complex is formed in situ in the reaction mixture from a complex, compound or salt, organic or inorganic, of a Group Ib metal and carbon monoxide. Examples of materials suitable in such methods comprise argentous, cuprous and cupric oxides, argentous, cuprous and cupric salts such as the salts of mineral acids, for example, nitrates, chlorides, sulfates, sulfonates, alkyl and aryl sulfonates, and the like and salts of carboxylic acids, for example, acetates, propionates, octanoates, chloroacetates, dichloroacetates, trifluoroacetates, and the like and aurous, argentous, cuprous and cupric complexes such as $AuCl_4^-$, $Au(CN)_2^-$, $Cu(NH_3)_2^+$, $CuH(C_5H_5N)_{0.2}$, and the like. Mixtures of these materials are also useful. Higher oxidation state materials, such as the cupric copper materials, are at least in part reduced in situ in the reaction zone to desired low-oxidation states.

In yet another method, a carbon monoxide complex of a Group Ib metal is prepared and used directly as catalyst. Suitable Group Ib metal carbon monoxide complexes comprise for example the copper carbonyls such as $CuCl(CO)$, $CuCF_3CO_2(CO)$, $Cu(SO_3CH_3)(CO)$ and $Cu(SO_3C_6H_5)(CO)$, the silver carbonyls $AgCF_3CO_2(CO)$, and an apparently newly discovered class of copper carbonyl complexes, cuprous alkenone carbonyls, which are complexes of copper (I) with carbon monoxide, $\alpha,\beta$-unsaturated ketones and as counter ion, hydride, alkyl or carbonyl- containing alkyl fragment. These materials are formed in copper-catalyzed reaction mixtures, are stable and may be isolated from reaction products of the copper-catalyzed process of the invention.

The process of the invention is characterized by the requirement for only catalytic quantities of Group Ib metal carbonyl catalyst. Although utilization of larger amounts of catalyst is not detrimental to the process of the invention, amounts larger than about 10 mole percent (calculated as moles of metal) based on the reactant carbon monoxide are not generally required. Amounts of metal less than about 0.01 mole percent on the same basis are generally impractical because of the inevitable physical losses of the catalyst during reaction and processing and the low rate of reaction. In most instances, amounts of catalyst from about 5 mole percent to about 0.1 mole percent based on reactant carbon monoxide are satisfactory and are preferred. ESpecially suitable are amounts of catalyst of from about 3 mole percent to about 0.3 mole percent on this basis.

Feedstocks

Suitable olefin feedstocks are ethylene and hydrocarbon fractions containing a major proportion of ethylene.

The process of the invention is characterized by the requirement of a reaction zone free of substantial amounts of hydrogen, either as a gas or as an active-hydrogen-containing material such as water, lower alkanols, and the like. Substantially hydrogen-free carbon monoxide and a non-aqueous reaction media are required if a suitable yield of ethyl vinyl ketone is to be realized. An absolutely hydrogen and hydrogen source-free reaction zone, while very suitable, is not required. Maintaining a very limited amount of hydrogen as gas or as an active hydrogen-containing material in the reaction zone does not decrease the rate of formation of the desired ethyl vinyl ketone. Thus amounts of hydrogen of up to 10 molar percent, based on the carbon monoxide present, can be present while amounts of 5 of no more than about 5 molar percent on the same basis are normally preferred, and amounts of hydrogen of no more than about 3 molar percent are most preferred.

In the particular embodiment of the invention wherein the Group I metal catalyst is formed from metallic copper it has been found to be very desirable to add a closely controlled amount of water to the reaction zone. Amounts of water of from about 0.25 moles to about 1.5 moles per mole of total copper present are suitable, with amounts of from about 0.35 moles to about 1.0 moles per mole of copper being preferred. Water additions of from 0.45 moles to 0.75 mole per mole of total copper are most preferred.

In the particular embodiment of the invention wherein cuprous alkenone carbonyls are added directly as catalyst, it is likewise very desirable to add a closely controlled but somewhat larger amount of water to the reaction zone. In this embodiment, addition of water of from about 0.5 mole to about 8 moles per mole of cuprous complex are suitable, with additions of from 1.0 to about 5 moles being preferred.

Reaction Products

Olefinically unsaturated ketones are prepared by the process of the invention. More specifically, ethyl vinyl ketone (I) is the major reaction product but small amounts of four 7-carbon unsaturated ketones are formed by the reaction of three ethylenes with one carbon monoxide, namely, hept-5-ene-3-one (II) hept-4-ene-3-one (IIa) 4-methyl hex-4-ene-3-one (III), 4-methyl hex-5-ene-3-one (IIIa), while traces of 9-carbon and higher unsaturated ketones formed by the reaction of four or more ethylenes with one carbon monoxide are produced.

Reaction Conditions

Reaction temperatures preferably range between about 150°C and about 210°C. At higher temperatures, such as above 250°C, there is a substantial formation of undesired higher molecular weight materials by polymerization of the ethyl vinyl ketone. Temperatures of from about 160°C to about 190°C are most preferred.

The molar ratio of ethylene to carbon monoxide ($C_2^{--}/CO$) is suitably maintained at at least 3 to 1 and preferably from about 4 to 1 to about 20 to 1. Ratios of from about 5 to 1 to about 12 to 1 are preferred with ratios of about 8 to 1 being most preferred.

The reaction may be carried out at a pressure of from about 1,000 psig to about 4,500 psig. Pressures in the range of from about 2,000 psig to about 3,500 psig are preferred.

The process of the invention is preferably carried out in liquid phase with a suitable inert reaction solvent. As reaction solvent, lower hydrocarbons and oxygenated lower hydrocarbons may be used. Suitable solvents comprise hydrocarbons of from about 4 to 15 carbon atoms, either saturated or having olefinic or aromatic unsaturation, and oxygenated hydrocarbons of from 4 to 15 carbons such as lower alkyl and aromatic ethers, lower alkyl esters, cyclic olefinic oxides, and the like. Examples of suitable solvents are: pentane, hexane, octane, decane, cyclo-hexane, hexane, toluene, and hydrocarbon fractions containing major proportions of said materials, ethyl phenyl ether, diphenyl ether, ethyl acetate, butyl butyrate, tetrahydrofuran, acetone, diethyl ketone, ethyl phenyl ketone, and 1,1-dichloroethane. Tetrahydrofuran and benzene are preferred solvents.

The process of the invention may be carried out as a batch operation or may be carried out continuously.

The invention will be further described with reference to the following examples. These are for illustrative purposes only and are not to be construed as limitations on the invention.

EXAMPLE I

To a nitrogen-purged stainless steel purge reactor were added 0.48g of copper powder (Allied Chemial Company, less than 300 mesh), 30g of dry tetrahydrofuran, 16g of ethylene, 2g of carbon monoxide and 0.070g of water. The molar ratio of ethylene to carbon monoxide was 8 to 1. The molar ratio of water to copper was 0.52 to 1. The reaction mixture was stirred at 180°C for 8 hours. Analysis of the product mixture showed that 26–32% of the carbon monoxide was converted into ketones. The selectivity to ethyl vinyl ketone was 65–75% molar and the selectivities to diethyl ketone and to 7-carbon unsaturated ketone were 15 and 20–9% molar respectively. Only traces of higher ketones were formed. The reaction solvent, feedstocks, and volatile products were fractionally distilled from the reaction product mixture. The residue from the fractional distillation was diluted with 5 ml of 30% benzene-70% hexane and cooled to 5°C. A white cooper-containing semi-solid was collected from the residue by filtration and washed with hexane. Infrared analysis of this material indicated the presence of copper-carbon monoxide bonding. The white color indicated the oxidation state of the copper to be +1. The semi-solid contained 30–35% by weight of copper. Following contact of the white semi-solid with hydrogen at elevated temperature to hydrogenate any unsaturated ligands in the complex organic vapors were separated from the solid and analyzed by gas liquid chromatography. This analysis indicated that the white solid contained a mixture of unsaturated ketones of 5 to 10 carbon atoms as ligands in the complex making up the semi solid. The following ketones were identified: ethyl vinyl ketone, α-β unsaturated ketones, hept-4-ene-3-one, 1,2-dihydro-2-ethyl-6-propionylpyran (the dimer of ethyl vinyl ketone), and a $C_8H_{12}O_2$ ketone apparently of structure

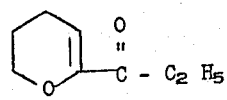

The complex was identified as a cuprous alkenone carbonyl complex.

EXAMPLE II

Ethylene (16g) and carbon monoxide (2 g) were reacted using general operating procedure of Example I. 0.15 g of the cuprous alkenone carbonyl complex as isolated in Example I was added as catalyst. The molar ratio of ethylene to carbon monoxide was 8 to 1 and the reaction temperature and pressure were 180°C and 2,800 psig. No water was added.

The reaction mixture was stirred for 8 hours. Analysis of the resulting product mixture showed that 16% of the carbon monoxide was converted into ketones and that selectivity to ethyl vinyl ketone was 77% molar. Selectivity to diethyl ketone and to 7-carbon unsaturated ketones were 9 and 14% molar respectively.

EXAMPLE III

Ethylene (16g) and carbon monoxide (2g) were reacted using the reactor and general operating procedure of Example II. 0.15 g of the cuprous alkenone carbonyl complex of Example I plus .040g of water was added as catalyst. The molar ratio of water to copper was 2.7 to 1. The reaction temperature and pressure were 180°C and 2,800 psig. Reaction time was 8 hours. Analysis of the product mixture showed 32% of the carbon monoxide was converted into ketones and that the selectivity to ethyl vinyl ketone was 65%. Selectivity to diethyl ketone and to 7-carbon unsaturated ketones were 17 and 18% respectively.

EXAMPLE IV

Ethylene (16g) and carbon monoxide (2g) were reacted in 30 g of THF solvent using the procedure of Example II. 0.12 g (1.5 mmoles) of $CuH(C_5H_5N)_{0.2}$, a cuprous hydride plus 30 mg (1.7 mmoles) of water was added as catalyst. The reaction mixture was stirred at 180°C for 8 hours. Analysis of the product mixture showed 16% of the carbon monoxide was converted into ketones and the selectivity to ethyl vinyl ketone was 75%. The selectivity to diethyl ketone and $C_7H_{12}O$ unsaturated ketones were 16 and 7%, respectively.

EXAMPLE V

Ethylene (16 g) and carbon monoxide (2 g) were reacted in 30 g of benzene solvent. 0.27 g of cuprous trifluoroacetate was used as catalyst. The reaction mixture was stirred at 166°–168°C for 16 hours during which time the pressure dropped from 2,800 to 2,200 psig. Analysis of the product mixture showed that 20% of the carbon monoxide was converted into ketones and that the ethyl vinyl ketone selectivity was 78%. The diethyl ketone and $C_7H_{12}O$ ketone selectivities were 18 and 4%, respectively.

EXAMPLE VI

A series of experiments were conducted to demonstrate the use of other Group Ib metal sources in the process of the invention. These experiments were conducted in apparatus of Example I using the general operating procedure of Example I. In each experiment 2 g (71 mmole) of carbon monoxide, 16 g (560 mmole) of ethylene and 30 g of reaction solvent were charged. The sources of Group Ib metal employed are listed in Table I. Reaction temperature was 190°C. Reaction pressure was 2,800 psig. The starting ethylene to carbon monoxide ratio was 8 to 1. The reaction time was 8 hours. The results of these experiments, including conversion and selectivity to desired ethyl vinyl ketone are given in Table I.

EXAMPLE VII

A series of experiments were conducted to demonstrate the effect of variation of the molar ratio of ethylene to carbon monoxide ($C_2^{--}/CO$) on reaction rate. These experiments were conducted in the apparatus of Example II using the general operating procedure of Example II. In each experiment 0.27 g of cuprous trifluoroacetate was used as a Group Ib metal source and 30 g of tetrahydrofuran was used as solvent. Reaction temperature was 175°C. Reaction pressure was 2,500–3,500 psig. Carbon monoxide and ethylene were added in amounts sufficient to give $C_2^{--}/CO$ ratios of 1:1, 3:1, 8:1 and 16:1. The results of these experiments are given in Table II.

EXAMPLE VIII

A series of experiments were conducted to demonstrate the effect of addition of controlled amounts of water to a reaction zone when the source of Group Ib metal is metallic copper. These experiments were conducted in the apparatus of Example I using the general operating procedure of Example I. In each experiment 16 g (560 mmoles) of ethylene, 2 g (71 mmoles) of carbon monoxide, 0.48 g (7.5 mmoles) of copper metal powder, and 30 grams of tetrahydrofuran solvent were charged and reacted for 8 hours at 180°C. The results of these experiments are given in Table III.

EXAMPLE IX

For purposes of comparison, a series of reactions were attempted in an 80 ml stirred reactor using the general feedstocks, operating procedures, and conditions of Example I. The following catalysts were used, many of which are known to be effective catalysts for the reaction of olefins with carbon monoxide in the presence of hydrogen, $Co_2(CO)_8$, $Fe_3(CO)_9$, $Re_2(CO)_{10}$, and as metal powders, rhenium, molybdenum, chromium, tungsten, and manganese. With these catalysts, no formation of desired ethyl vinyl ketone was noted.

TABLE I

| Group Ib Metal Source | Solvent | Moles of Group Ib Metal | Conversion of Carbon Monoxide to Ketones, %m | Selectivity, %m |  |  |
|---|---|---|---|---|---|---|
|  |  |  |  | Ethyl vinyl ketone | 7-carbon Unsat. Ket. | Diethyl Ketone |
| $Cu(Cf_3CO_2)$ | THF or $C_6H_6$ | 1.5 | 20–27 | 75–80 | 2–4 | 18–22 |
| $Cu(SO_3C_6H_5)$ | $C_6H_6$ | 1.5 | 15 | 85 | Trace | 10 |
| $Cu(SO_3CH_3)$ | $C_6H_6$ | 1.5 | 8 | 84 | Trace | 10 |
| CuCl | THF | 1.5 | 6 | 82 | Trace | 18 |
| $Ag(CF_3CO_2)$ | $C_6H_6$ | 1.5 | 30 | 55–60 | 5 | 30–35 |
| Cuprous di-t-butyl-salicylate | $C_6H_6$ | 1.5 | 12 | 75 | 3 | 10 |

TABLE II

| Ethylene, g | Carbon Monoxide, g | $C_2^=/CO$ | Conversion of Carbon Monoxide to Ketones, %m | Selectivity, %m Ethyl vinyl ketone | 7-carbon Unsat. Ket. | Diethyl ketone, |
|---|---|---|---|---|---|---|
| 4 | 4 | 1:1 | Trace | — | — | — |
| 12 | 4 | 3:1 | 2.5–4 | 92 | Trace | 8 |
| 16 | 2 | 8:1 | 23–26 | 75–80 | 2 | 18–20 |
| 16 | 1 | 16:1 | 8–12 | 78 | 2 | 18 |

TABLE III

| Mmoles of Added Water | Conversion of Carbon Monoxide to Ketones, % | Selectivity, %m Ethyl vinyl ketone | Diethyl ketone | $C_7H_{12}O$ Ketone |
|---|---|---|---|---|
| <0.5 (anhydrous) | 2 | 92 | 8 | None |
| 1.5 (estimated) | 6 | 90 | 10 | None |
| 2.7 | 25 | 60 | 20 | 20 |
| 3.8 | 32 | 65 | 15 | 20 |
| 7.5 | 12 | 74 | 21 | 5 |

I claim as my invention:

1. The process of producing predominantly ethyl vinyl ketone by reacting ethylene and carbon monoxide in the presence of water at a temperature of from about 150° to about 210°C. and at a pressure of 1,000 to 4,500 psig and an ethylene to carbon monoxide molar ratio of from 5 to 1 to about 12 to 1 in an inert liquid phase reaction solvent selected from the group consisting of hydrocarbons, alkyl ethers, aromatic ethers, alkyl esters, cyclic olefinic oxides aliphatic ketones and aromatic ketones, each containing from 4 to 15 carbon atoms in the presence of a cuprous alkanone carbonyl complex as catalyst, wherein the water is present in a ratio of 1.0 to about 5 moles of water per mole of said cuprous catalyst wherein the amount of cuprous metal catalyst present in the amount of from 0.01% mole to about 10% mole based on the amount of carbon monoxide present.

2. The process of producing predominantly ethyl vinyl ketone by reacting ethylene and carbon monoxide in the substantial absence of hydrogen at a temperature of from about 150°C to about 210°C, at a pressure of 1,000 to 4,500 psig, and an ethylene to carbon monoxide molar ratio of from about 3 to 1 to about 20 to 1 in an inert liquid phase reaction solvent selected from the class consisting of hydrocarbons, alkyl ethers, aromatic ethers, alkyl esters, cyclic olefinic oxides, aliphatic ketones and aromatic ketones, each containing from 4 to 15 carbon atoms in the presence of a complex of carbon monoxide with a zero or plus one oxidation state Group I*b* metal catalyst.

3. The process of claim 2 wherein the Group I*b* metal is copper in a zero or plus one oxidation state.

4. The process of claim 3 wherein the molar ratio of ethylene to carbon monoxide is from about 5 to 1 to about 12 to 1 and the Group I*b* metal catalyst is present in an amount of from 0.01% mole to about 10% mole based on the amount of carbon monoxide present.

5. The process of claim 4 wherein the Group I*b* metal is cuprous copper and wherein the copper carbonyl is formed in situ from copper metal or a copper salt.

6. The process of claim 2 wherein the Group I*b* metal is silver and wherein the silver carbonyl catalyst is formed in situ from a silver salt.

* * * * *